Nov. 21, 1939.     T. RAEDLE     2,180,720

PIPE JOINT

Filed March 17, 1939

INVENTOR
THEODOR RAEDLE
BY
Richards & Geier
ATTORNEYS

Patented Nov. 21, 1939

2,180,720

UNITED STATES PATENT OFFICE 2,180,720

PIPE JOINT

Theodor Raedle, New York, N. Y.

Application March 17, 1939, Serial No. 262,369

10 Claims. (Cl. 285—162)

This invention relates to a self-balancing or automatically adjustable expansion joint for pipes and the like.

An object of the present invention is the provision of a self-balancing or automatically adjustable expansion joint which is comparatively simple in construction and operation and through the use of which pipes subjected to expansion or contraction due to variations in temperatures are effectively joined together.

Another object is to eliminate packings used heretofore for joining expanding and contracting pipes, which may be easily damaged if high pressure prevails within the pipes or if hot oil or the like flows therethrough, and to substitute therefor an automatically operable expansion joint which will remain effective irrespective of the pressure in the pipes or of the substance flowing through the pipes.

Other objects of the present invention will appear in the course of the following specification.

The objects of the present invention may be realized through the provision of a pipe joint having a rotary adjusting element which is caused to rotate by the expansion or contraction of the pipes.

The invention will appear more clearly from the following detailed description when taken in connection with the accompanying drawing, showing by way of example preferred embodiments of the inventive idea.

Figure 1:
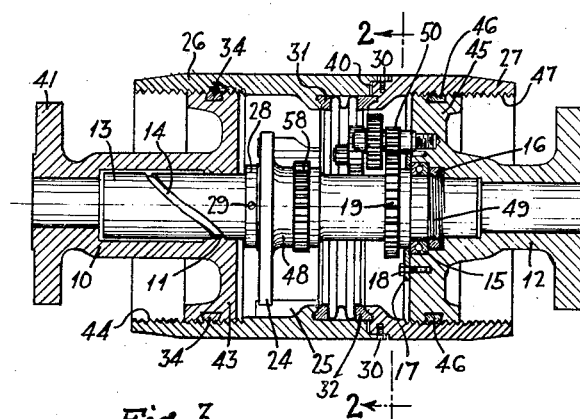
Figure 1 is a section through a joint constructed in accordance with the principles of the present invention along the lines 1—1 of Figure 2.
Figure 2:
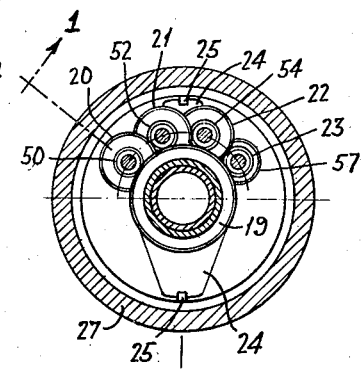
Figure 2 is a transverse vertical section along the line 2—2 of Figure 1.
Figure 3:
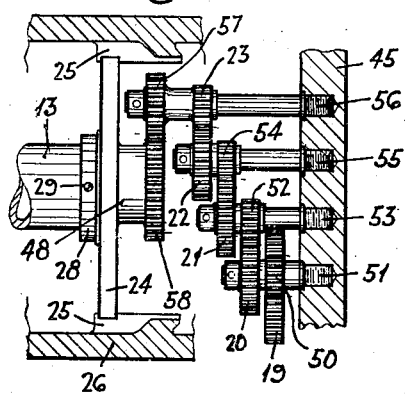
Figure 3 is a diagram illustrating a gear drive.

The pipe joint illustrated in Figures 1 to 5 of the drawing comprises an outer rotary casing consisting of two sleeves 26 and 27 separated from each other by a space 40. Bolts 30 which join the sleeves 26 and 27, are screwed into the sleeve 27 and extend through comparatively wide openings provided in the sleeve 26, so that there is a sufficient amount of play in axial directions between the two sleeves 26 and 27.

Figure 5:
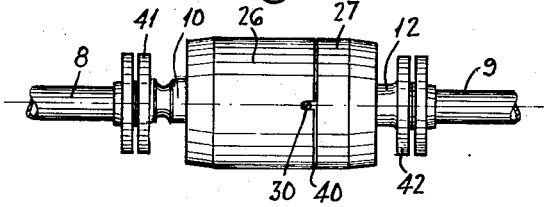
Figure 5 shows the device in side elevation.

The sleeves 26 and 27 enclose the ends of two shells or connecting pieces 10 and 12. The shell 10 comprises a flange 41 which is connected with a flange of the main pipe 8 (Figure 5). The shell 12 is provided with a flange 42 which is connected with a flange of the second main pipe 9.

As shown in Figure 1, the shell 10 comprises an inner flange member 43 having, for example, left-handed screw-threads meshing with the inner screw-threads 44 of the sleeve 26. The flange 43 also carries a metallic packing ring 34 pressed into the flange.

An inter-connecting pipe or sleeve 13 extends through the shells 10 and 12, and that portion of the pipe 13 which is situated within the shell 10, is provided with a helical slot 14.

An inner wall of the shell 10 comprises a projection or rib 11 projecting into the slot 14 and engaging the side walls thereof.

The shell 12 comprises a flange portion 45 provided with a metallic packing ring 46 which is pressed into the flange 45. The flange 45 has, for example, right-handed screw-threads meshing with the inner screw-threads 47 of the sleeve 27.

The flanges 43 and 45 may be provided with additional packing means, if necessary.

A ring 16 is screwed upon a threaded portion 49 of the pipe 13 and is enclosed by the shell 12.

Ball bearings 15 support the pipe 13 within the shell 12 and are held on one side by the ring 16 and on the other side by a disc 17 attached to an end wall of the flange 45 by the bolts 18.

Figure 4:
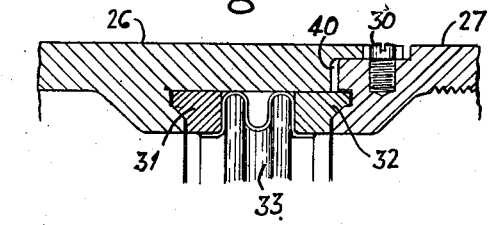
Figure 4 shows a portion of the device illustrated in Figure 1 on a larger scale.

As shown in Figures 1 and 4, a packing ring 31 is situated within the sleeve 26 and is firmly connected therewith, while a packing ring 32 is firmly connected with the sleeve 27 and covers the space 40 between the sleeves 26 and 27. The packing rings 31 and 32 are connected with each other by a fluted or corrugated packing shell 33, which may be extended or drawn together to compensate for any relative movement of the sleeves 26 and 27 in the direction of their axes.

Obviously, the shell 33 may be replaced by any other suitable connecting means.

A ring 28 is firmly connected with the pipe 13 by one or more bolts 29 and is used to prevent the shifting of a sleeve 48, which is loosely mounted upon the pipe 13 and is rotatable relatively thereto. The sleeve 48 is integral with a flange 24 having the form of two diametrically opposed levers provided with forked ends engaging diametrically opposed projections 25 which are integral with the sleeve 26.

The pipe 13 is integral with a toothed crown 19 which meshes with the pinion 50 rotatably mounted upon a pivot 51 which is screwed into the side wall of the flange 45. The pinion 50 is integral with a gear wheel 20 which meshes with the gear wheel 52 rotatably mounted upon a pivot 53, which is also screwed into the flange 45. The gear wheel 52 is integral with the gear wheel 21, which meshes with a gear wheel 54 rotatably mounted upon a pivot 55. The pivot 55 is also screwed into the flange 45 and is carried thereby. The gear wheel 54 is integral with the gear wheel 22 which meshes with the gear wheel 23. The gear wheel 23 is supported by the pivot 56 and is firmly connected with the gear wheel 57. The pivot 56 is also screwed into the flange 45. The gear wheel 57 meshes with the toothed crown 58 which is integral with the sleeve 48.

The device is operated as follows:

The pressure created by the expansion or contraction of the pipes 8 and 9 (Figure 5) is transmitted to the flanges 43 and 45. At the same time, the projection or rib 11 engaging the side walls of the helical slot 14 will exert pressure upon the pipe 13 which is rotatably mounted in the shells 10 and 12. Due to the helical form of the slot 14, the pressure exerted by the projection 11 will cause a rotation of the sleeve 13, the direction of the rotation depending upon the direction of the pressure, i. e., whether it was caused by expansion or contraction. The toothed crown 19 which is firmly connected to the pipe 13 will rotate with the pipe 13. Since the crown 19 meshes with the pinion 50, the rotation of the pipe 13 will be transmitted thereto, and thence will be transmitted through the gear wheels 20, 52, 21, 54, 22, 23 and 57 to the toothed crown 58 which is integral with the sleeve 48 freely mounted upon the pipe 13. The sleeve 48 will thus tend to rotate upon the pipe 13 and since the flange 24 of the sleeve 48 is in engagement with the projections 25 of the sleeve 26, the sleeve 26 will rotate along with the sleeve 48. Due to the provision of screw-threads 44 meshing with the screw-threads of the flange 43, the sleeve 26 will carry out a rotary movement and a forward movement relatively to the immovable flange 43. Since the sleeve 27 having screw threads 47 is connected with the sleeve 26 by the bolts 30, the sleeve 27 will participate in the movement of the sleeve 26.

The rings 31 and 32 must be flexibly connected with each other to provide for small axial movements of the sleeves 26 and 27 (Figure 4) resulting from the clearance of the gears.

Figure 6:
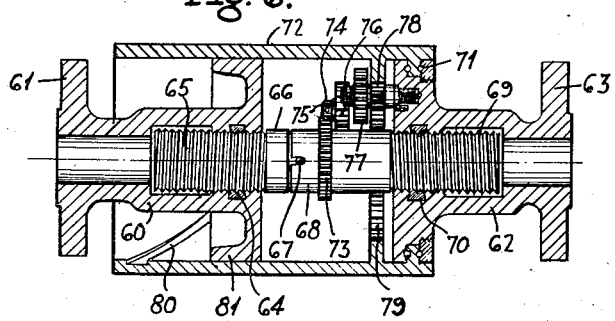
Figure 6 is a vertical longitudinal section through a pipe joint of a different form.

The joint shown in Figure 6 of the drawing comprises a shell 60 having a flange 61 which may be connected to a main pipe. Another shell 62 is provided with a flange 63 which may be connected to another main pipe. The shell 60 carries a metallic packing ring 64 and has inner screw-threads, meshing with the outer screw-threads 65, (for example, left-handed ones) of a sleeve 66 which is carried by the shell 60 and is connected by one or more bolts 67 with another sleeve 68 carried by the shell 62. There is play or clearance between the abutting ends of the sleeves 66 and 68. The sleeve 68 is provided with screw-threads 69 (for example, right-handed ones) meshing with the inner screw-threads of the shell 62 having a metallic packing ring 70.

The shell 62 carries ball bearings 71 supporting an outer sleeve 72.

The sleeve 68 is integral with a toothed crown 73 which meshes with a gear wheel 74. The rotation of the gear wheel 74 is transmitted by a gear wheel 75 to gear wheel 76. The rotation of the gear wheel 76 is transmitted by the gear wheel 77 to the gear wheel 78, which is in engagement with the inner teeth of a crown 79 constituting a part of the sleeve 72. The number of these gear wheels may correspond to that of the gear wheels shown in Figure 3.

The sleeve 72 is provided with a helical groove 80 meshing with a corresponding projection provided in the flange 81 of the shell 60.

The operation of this device is substantially similar to that described. However, the transmission of forces take place in the opposite direction. When pressure caused by contraction or expansion is exerted upon the shells 60 and 62, the projection of the flange 81 will press against the side walls of the groove 80 and will cause a rotation of the sleeve 72. This rotation will be transmitted by the crown 79 to the gear wheels 78, 77, 76, 75, and 74 and to the toothed crown 73 which is integral with the sleeve 68. Thus the sleeves 66 and 68 will be moved and an adjustment of the joint will follow. The space or clearance between the abutting ends of the sleeves 66 and 68 is necessary to provide for small axial movements of the sleeves relatively to each other. An inner packing should be provided to cover this clearance, similar to that shown in Figure 4.

Figure 7:
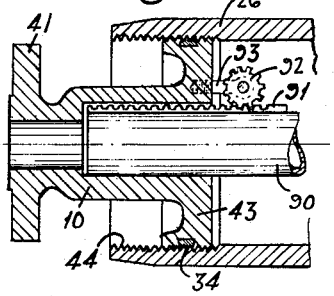
Figure 7 shows in longitudinal section a portion of a differently constructed joint.

Figure 7 shows a joint which may be substantially similar to that shown in Figures 1 to 5, similar parts being indicated by the same numerals. The inner pipe 90 situated within the shell 10 of the joint shown in Figure 7, is provided with projecting elements 91 meshing with the teeth of a rotary gear wheel 92 which is carried by an arm 93 screwed into the flange 43 of the shell 10. Thus, the pressure caused by contraction or expansion is transmitted by the shell 10 and through the gear wheel 92 to the pipe 90 causing a movement of this pipe. The effect of this construction is substantially similar to those previously described. The gear wheel 92 may be used to drive either the inner pipe 90 or the outer sleeve 26.

It is apparent that the specific illustrations shown above have been given by way of illustration and not by way of limitation, and that the structures above described are subject to wide variation and modification without departing from the scope or intent of the invention, all of which variations and modifications are to be included within the scope of the present invention.

What is claimed is:

1. A pipe joint, comprising a rotary adjusting element, and means connected with said element and actuated by the expansion and contraction of a pipe caused by temperature variations to impart rotation to said rotary adjusting element.

2. A pipe joint, comprising a shell adapted to be connected to a pipe, a movable member, said shell and said member having interengaging parts imparting a movement to said member when pressure is exerted upon said shell resulting from the expansion and contraction of the pipe caused by temperature variations, a rotary adjusting element, and means connected with said rotary adjusting element and said movable member to transmit the movement of said member to said adjusting element and cause a rotation of the latter.

3. A pipe joint, comprising a shell adapted to be connected to a pipe, a rotary member, said shell and said member having interengaging parts imparting rotation to said member when pressure is exerted upon said shell resulting from the expansion and contraction of the pipe caused by temperature variations, a rotary adjusting element, said shell and said adjusting element having interengaging screw threads, and means connected with said rotary adjusting element and said rotary member to transmit the movement of said member to said adjusting element.

4. A pipe joint comprising two shells each of which is adapted to be connected to a separate pipe, a rotary member, one of said shells and said member having interengaging parts imparting rotation to said member when pressure is exerted upon said shells resulting from the expansion and contraction of the pipes caused by temperature variations, two rotary interconnected adjusting elements, a play being provided between said adjusting elements, each shell and a separate adjusting element having interengaging corresponding screw threads to provide a joint movement of the adjusting elements and means connected with one of said adjusting elements and said rotary member to transmit the movement of said member to said adjusting elements.

5. A pipe joint comprising two shells each of which is adapted to be connected to a separate main pipe, a rotary pipe, one of said shells and said rotary pipe having interengaging parts imparting rotation to said rotary pipe when pressure is exerted upon said shells resulting from the expansion and contraction of the main pipes caused by temperature variations, two rotary interconnected sleeves, a play being provided between said sleeves, each shell and a separate sleeve having interengaging corresponding screw threads to provide a joint movement of the sleeves, and means connected with one of said sleeves and said rotary pipe to transmit the movement of said rotary pipe to said sleeves.

6. A pipe joint comprising two shells each of which is adapted to be connected to a separate main pipe, a rotary pipe situated within said shells and rotatably supported by said shells, one of said shells and said rotary pipe having interengaging parts imparting rotation to said rotary pipe when pressure is exerted upon said shells resulting from the expansion and contraction of the main pipes caused by temperature variations, two rotary interconnected sleeves enclosing adjacent portions of said shells, a play being provided between said sleeves, each shell and a separate sleeve having interengaging corresponding screw threads to provide a joint movement of the sleeves, and a gear drive connected with one of said sleeves and said rotary pipe to transmit the movement of said rotary pipe to said sleeves.

7. A pipe joint comprising two shells each of which is adapted to be connected to a separate main pipe, a rotary pipe situated within said shells and rotatably supported by said shells, one of said shells having a projection engaging a helical slot formed in said rotary pipe to impart a rotation to said rotary pipe when pressure is exerted upon said shells resulting from the expansion and contraction of the main pipes caused by temperature variations, two rotary interconnected sleeves enclosing adjacent portions of said shells, a play being provided between said sleeves, a separate packing ring carried by each sleeve, an extensible and contractable element interconnecting said rings, each shell and a separate sleeve having interengaging corresponding screw threads to provide a joint movement of the sleeves, a toothed crown firmly connected with said rotary pipe, a sleeve mounted upon said rotary pipe and rotatable relatively thereto, said sleeve having a toothed portion and a flange portion engaging one of the first-mentioned sleeves, and a gear drive connected with said toothed crown and the toothed portion of the last-mentioned sleeve.

8. A pipe joint comprising two shells each of which is adapted to be connected to a separate main pipe, a separate inner rotary sleeve carried by each shell and having corresponding screw threads engaging screw threads formed in the shell, means interconnecting the two rotary inner sleeves to provide a joint movement of the sleeves, a play being provided between the two rotary inner sleeves, an outer rotary sleeve, one of said shells and said outer rotary sleeve having interengaging parts imparting rotation to said outer rotary sleeve when pressure is exerted upon said shells resulting from the expansion and contraction of the main pipes caused by temperature variations, and means connected with one of the inner rotary sleeves and the outer rotary sleeve to transmit the rotation of the outer rotary sleeve to the inner rotary sleeves.

9. A pipe joint comprising two shells each of which is adapted to be connected to a separate main pipe, a separate inner rotary sleeve carried by each shell and having corresponding screw threads engaging screw threads formed in the shell, a separate packing ring carried by each shell and engaging the sleeve within that shell, means interconnecting the two rotary inner sleeves to provide a joint movement of the sleeves, a play being provided between the two rotary inner sleeves, an outer rotary sleeve, one of said shells and said outer rotary sleeve having interengaging parts imparting rotation to said outer rotary sleeve when pressure is exerted upon said shells resulting from the expansion and contraction of the main pipes caused by temperature variations, a toothed crown carried by one of said inner rotary sleeves and firmly connected therewith, an inner toothed crown firmly connected with said outer rotary sleeve, and a gear drive interconnecting said toothed crowns.

10. A pipe joint, comprising a shell adapted to be connected to a main pipe, a movable element carried by said shell and having projecting elements formed therein, a gear wheel carried by said shell and engaging said projecting elements to impart a movement to said movable element when pressure is exerted upon said shell resulting from the expansion and contraction of the main pipe caused by temperature variations, a rotary adjusting element, and means connected with said rotary adjusting element and said movable element to transmit the movement of said movable element to said adjusting element and cause a rotation of the latter.

THEODOR RAEDLE.